United States Patent
Sakiyama et al.

(10) Patent No.: US 6,936,768 B2
(45) Date of Patent: Aug. 30, 2005

(54) PLATE AND ELECTRIC DEVICE

(75) Inventors: Hideki Sakiyama, Shizuoka (JP);
Hiroshi Sano, Shizuoka (JP); Kunitake Matsushita, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/690,008

(22) Filed: Oct. 21, 2003

(65) Prior Publication Data

US 2004/0084201 A1 May 6, 2004

(30) Foreign Application Priority Data

Oct. 21, 2002 (JP) .......................... 2002-306257

(51) Int. Cl.[7] .............................................. H05K 5/00
(52) U.S. Cl. ......................... 174/52.1; 310/89; 310/91
(58) Field of Search ........................ 174/52.1; 310/89, 310/91, 273; 361/679, 807, 809, 810, 811, 812

(56) References Cited

U.S. PATENT DOCUMENTS

| | | | |
|---|---|---|---|
| 5,258,675 A | | 11/1993 | Nelessen |
| 5,661,356 A | * | 8/1997 | Fisher et al. ................. 310/219 |
| 5,850,115 A | | 12/1998 | Grosskopf |
| 6,648,540 B2 | * | 11/2003 | Brisson et al. ................ 403/16 |
| 2002/0011384 A1 | | 1/2002 | Doran |

FOREIGN PATENT DOCUMENTS

| | | |
|---|---|---|
| EP | 0942514 A2 | 9/1999 |
| JP | 05-144198 A | 6/1993 |

* cited by examiner

Primary Examiner—Dean A. Reichard
Assistant Examiner—Carmelo Oliva
(74) Attorney, Agent, or Firm—Townsend and Townsend and Crew LLP

(57) ABSTRACT

A support hole, screw holes, and eleven orientating holes are formed in a plate. The orientating holes are each positioned asymmetric to any other thereof about a center of the plate.

18 Claims, 20 Drawing Sheets

FIG.1A
FIG.1B
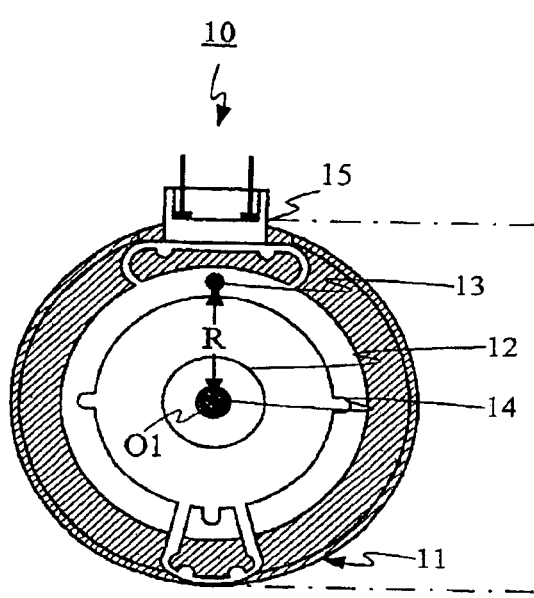
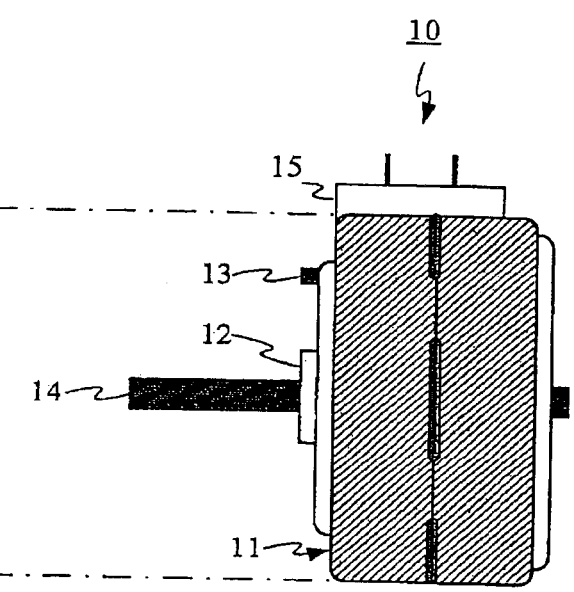

FIG.9A
FIG.9B
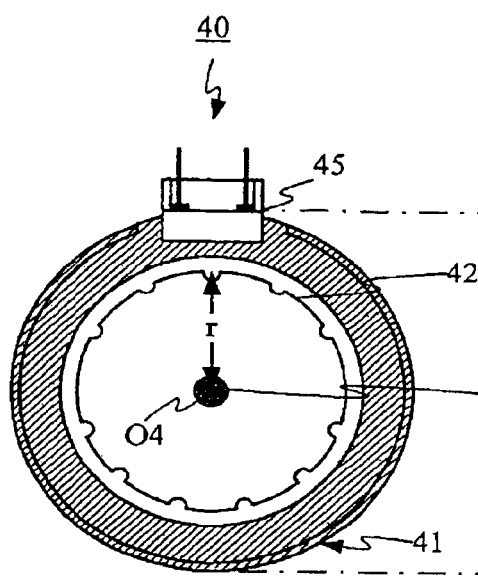
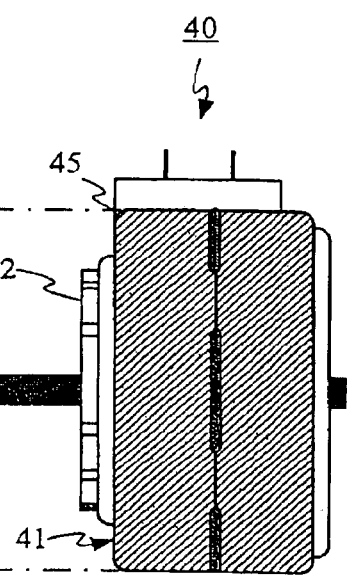

FIG.17A
FIG.17B
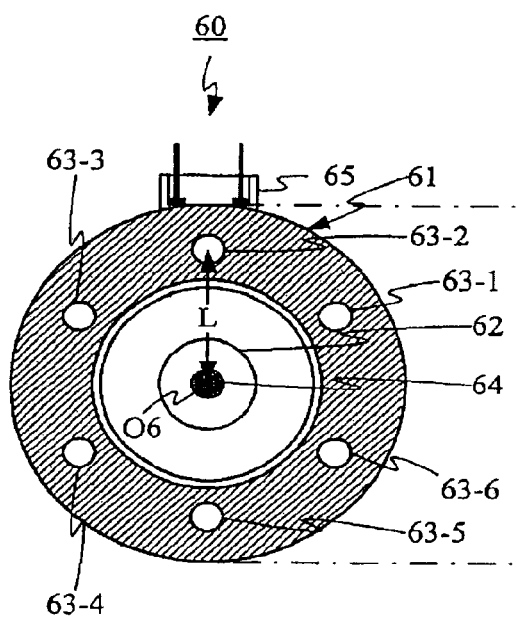
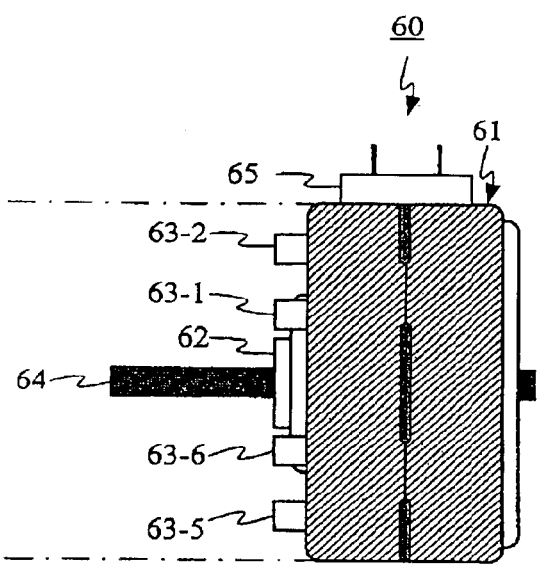

PLATE AND ELECTRIC DEVICE

BACKGROUND OF THE INVENTION

1. Field of the Invention

The present invention relates to a plate and an electric device attached to a body of an equipment by way of the plate, and particularly to a plate and an electric device attached to a body of an equipment by way of the plate with minutely adjustable angles relative to the equipment body.

2. Description of the Related Art

Equipments such as printers and personal computers include a paper forwarding mechanism and a head moving mechanism. The drive source for the paper forwarding mechanism and head moving mechanism is a direct current (DC) motor or a stepping motor. Recent printers and personal computers are increasingly miniaturized, and accordingly the DC motor and stepping motor to be incorporated into the paper forwarding mechanism and head moving mechanism are also miniaturized. Under the circumstances, it is becoming a critical issue in designing an equipment how a terminal of a motor should be oriented in order to efficiently utilize the space available inside the body of the equipment when the motor is attached to the body of the equipment.

To deal with this issue, there has been provided a motor which is combined with a plate for attaching the motor to an equipment allowing its terminal to be appropriately oriented relative to a body of an equipment. Examples of such a motor with a plate will now be explained with reference to drawings.

FIG. 17A is an elevation of a conventional motor, and FIG. 17B is a side elevation of the motor. As shown in FIG. 17A, a motor 60 basically comprises a stator 61 having an approximately cylindrical structure. The stator 61 has an approximately circular embossed support member 62 on its front end surface, which has its center positioned so as to coincide with a center O6 of the front end surface. The stator 61 also has six circular embossed orientating members 63-1 to 63-6 on the front end surface, which have their respective centers positioned equidistantly apart from the center O6 by a dimension L and equiangularly (60 degrees) from adjacent ones with respect to the center O6, in other words, the orientating members 63-1 to 63-6 are arranged at a regular interval along the circumference of a circle which defines the center O6 and a radius of the dimension L. The support member 62 is formed so as to rotatably fit into a support hole 71 formed in a plate 70 to be described later in FIG. 18. As shown in FIG. 17B, the stator 61 has, on its circumferential surface, a terminal block 65 with terminal pins which are connected to an unillustrated external circuit (hereinafter, terminal block with terminal pins is referred to as "terminal"). A rotation shaft 64 penetrates through the motor 60 at the center of the front end surface of the stator 61, and is otherwise exposed. The orientating members 63-1 to 63-6 are each formed so as to fit into any one of orientating holes 73-1 to 73-6 (refer to FIG. 18) formed in the plate 70 to be detailed later.

A more detailed explanation will now be made on the positions of the orientating members 63-1 to 63-6 with reference to FIG. 19A. FIG. 19A is a diagram for explaining the positions of orientating members. In FIG. 19A, the center O6 of the front end surface is assumed to be an origin, a line that passes through the center O6 and the terminal 65 is assumed to be a Y axis, and a line that passes through the center O6 and is orthogonal to the Y axis is assumed to be an X axis. As shown in FIG. 19A, the coordinates of the centers of the orientating members 63-1 to 63-6 are represented by an equation (9) below.

$$(x_j, y_j) = \left(L \cdot \left(\frac{j \cdot \pi}{6}\right), L \cdot \left(\frac{j \cdot \pi}{6}\right)\right) \ (1 \leq j \leq 6) \quad (9)$$

The aforementioned plate 70 shown in FIG. 18 is formed of a substantially circular plate of stairless steel or the like, and defines a center O7. A circular support hole 71 is formed in the plate 70 and has its center positioned so as to coincide with the center O7. The support hole 71 has a diameter substantially equal to the outer diameter of the support member 62 and therefore is adapted to rotatably fit to the support member 62. Two approximately circular screw holes 72A and 72B are formed respectively in both ends of the plate 70. The screw holes 72A and 72B have a diameter substantially equal to the diameter of two screws 31A and 31B provided at a body 30 (to be described later in FIG. 20) of an equipment. The screw hole 72A has one of the two screws 31A and 31B going therethrough, and the screw hole 72A has the other of the two going therethrough. The plate 70 further has six circular orientating holes 73-1 to 73-6 which have their respective centers positioned equidistantly apart from the center O7 by the dimension L and equiangularly (60 degrees) from adjacent ones with respect to the center O7, in other words, the orientating holes 73-1 to 73-6 are arranged on the circumference of a circle which defines the center O7 and a radius of the dimension L. The orientating holes 73-1 to 73-6 have a diameter substantially equal to the outer diameter of the orientating members 63 and therefore are adapted to fittingly engage with the orientating members 63.

The positions of the orientating holes 73-1 to 73-6 will now be explained in more detail with reference to FIG. 19B. FIG. 19B is a diagram for explaining the positions of orientating holes formed in a plate. In FIG. 19B, the center O7 of the plate 70 is assumed to be an origin, a line that passes through the center O7, the center of the screw hole 72A, and the center of the screw hole 72B is assumed to be an X axis, and a line that passes through the center O7 and crosses the X axis orthogonally is assumed to be a Y axis. As shown in FIG. 19B, the coordinates of the centers of the orientating holes 73-1 to 73-6 are represented by the equation (9), like the coordinates of the centers of the orientating members 63-1 to 63-6.

Next, a method of attaching the motor 60 to the body 30 by using the plate 70, and also a method of orientating the motor 60 relative to the body 30, that is, orientating the terminal 65 relative to the body 30 will be explained. First, the plate 70 is set to the motor 60 such that the support hole 71 fits to the support member 62, and such that the orientating member 63-1 fits into one of the orientating holes 73-1 to 73-6, with the other orientating members 63-2 to 63-6 fitting respectively into the other orientating holes than the one which has the orientating member 63-1 fitting thereinto. Then, the plate 70 which is set to the motor 60 as described above is attached to the body 30 such that the screw holes 72A and 72B engage respectively with the screws 31A and 31B which are provided at the body 30.

Thus, the motor 60 can be attached onto the body 30 by way of the plate 70. Further, by selectively changing the mating combination of the orientating members 63-1 to 63-6 with the orientating holes 73-1 to 73-6, the orientation of the motor 60 relative to the body 30, that is, the orientation of the terminal 65 relative to the body 30 can be set optimally.

The orientation of the terminal 65 relative to the body 30 will now be explained in more detail with a specific example. FIG. 20 is a diagram for explaining the orientation of the terminal 65 relative to the body 30. In FIG. 20, the center O6 of the motor 60 is assumed to be an origin, a line that passes through the center O6, the center of the screw 31A, and the center of the screw 31B is assumed to be an X axis, and a line that passes through the center O6 and crosses the X axis orthogonally is assumed to be a Y axis. An angle formed by the terminal 65 and the X axis is assumed to be θ.

As shown in FIG. 20, in a case where the support hole 71 is set to the support member 62 such that the orientating hole 73-1 fits to the orientating member 63-1, the angle θ is π/2(=90°). Likewise, in a case where the support hole 71 is set to the support member 62 such that the orientating hole 73-1 fits to the orientating member 63-2 [63-3, 634, 63-5, and 63-6], the angle θ is 5π/6 (=150°) [7π/6 (=210°), 3π/2 (=270°), 11π/6 (=330°), and π/6(=30°), respectively].

Thus, the motor 60 can allow the terminal 65 to be oriented in six ways relative to the body 30 in increments of 60 degrees.

However, in a case where the orientation of the terminal 65 must be adjusted more minutely, for example, in increments of 15 degrees, the motor 60 combined with the plate 70 described above does not work. In such a case, additional plates having an increased number of orientating holes arranged at a smaller interval are required. This results in complicating the management of components and also motor assembly.

SUMMARY OF THE INVENTION

The present invention was made to solve the above-described problem, and an object of the present invention is to provide a plate and an electric device which in combination allow minute adjustment of their orientation relative to a body of an equipment.

To achieve the above object, a plate according to a first aspect of the present invention is a plate for attaching a device to an equipment body having a pair of first attaching means, said plate comprising: second attaching means which is formed so as to fit to one of said pair of first attaching means of said equipment body; and third attaching means which is positioned symmetric to said second attaching means about a center of said plate so as to fit to the other of said pair of first attaching means.

To achieve the above object, the plate adapted to attach said device to said equipment body, wherein said device has approximately circular first supporting means, and first orientating means positioned apart from a center of said first supporting means by a predetermined dimension, and wherein said plate further comprises: second supporting means which has an approximately circular structure and which has its center coinciding with said center of said plate so as to fit to said first supporting means of said device; and plurality of second orientating means which are positioned on a circumference of a circle having its center coinciding with said center of said plate and having a radius of said predetermined dimension, and which are each formed so as to fit to said first orientating means of said device, at least one of said plurality of second orientating means being positioned asymmetric to any of the other second orientating means about said center of said plate.

In the plate, adapted to attach said device, wherein said second and third attaching means, said second supporting means, and said plurality of second orientating means of said plate are of a holed structure so as to fit respectively to said first attaching means, said first supporting means, and said first orientating means of said device, which are of an embossed structure.

In the plate, a distance between any two of said plurality of second orientating means of said plate is smaller than 2× said determined dimension R.

In the plate, said plurality of second orientating means is provided in an odd number.

In the plate, coordinates (xk, yk) (1≦k≦2n+1) of said plurality of second orientating means is defined by equations (1) and (2) below when said center of said plate is assumed to be an origin, a line which passes through said origin and said second and third attaching means is assumed to be an X axis, a line which passes through said origin and crosses said X axis orthogonally is assumed to be a Y axis, said predetermined distance is assumed to be R, and a number of said plurality of second orientating means is assumed to be (2n+1) (where n is a natural number), $$(x_k, y_k) = \left(R \cdot \cos\left(\frac{k \cdot \pi}{(n+1)}\right), R \cdot \sin\left(\frac{k \cdot \pi}{(n+1)}\right)\right) (1 \le k \le n) \quad (1)$$

$$(x_k, y_k) = \left(R \cdot \cos\left(\frac{(2k+1) \cdot \pi}{2(n+1)}\right), R \cdot \sin\left(\frac{(2k+1) \cdot \pi}{2(n+1)}\right)\right) (n+1 \le k \le 2n+1). \quad (2)$$

In the plate, said device is of an approximately cylindrical structure, has said first supporting means formed approximately at a center of one end surface thereof, has said first orientating means formed on said one end surface and positioned apart from said center by said predetermined dimension, and has a protruding portion provided at a predetermined position on a circumferential surface thereof In the plate, said device is an electric device, and said protruding portion is a terminal for connection to an external circuit.

To achieve the above object, an electric device which is of an approximately cylindrical structure, and which has on a circumferential surface thereof a terminal for connection to an external circuit, said electric device comprising: said first supporting means which is positioned approximately at a center of one end surface of said electric device; said first orientating means which is positioned apart from said center by a predetermined dimension; and said plate according to claim 2 which has said second supporting means adapted to fit to said first supporting means, and which has said plurality of second orientating means each adapted to fit to said first orientating means.

To achieve the above object, the plate adapted to attach said device to said equipment body, wherein said device has approximately circular third supporting means, and has also plurality of third orientating means formed on a circumference of said third supporting means, and wherein said plate further comprises: fourth supporting means which has an approximately circular structure and which has its center coinciding with said center of said plate so as to fit to said third supporting means of said device; and fourth orientating means which is adapted to fit to any one of said plurality of third orientating means of said device.

In the plate, adapted to attach said device, wherein said third supporting means of said device is of an embossed structure, and said fourth supporting means of said plate is of a holed structure.

In the plate, said fourth orientating means of said plate is one of an embossed structure and a caved structure, and said plurality of third orientating means of said device are contrarily one of a caved structure and an embossed structure to thereby fit to said fourth orientating means.

In the plate, said device is of an approximately cylindrical structure, has said fourth supporting means formed approximately at a center of one end surface thereof, and has a protruding portion provided at a predetermined position on a circumferential surface thereof.

In the plate, said device is an electric device, and said protruding portion is a terminal for connection to an external circuit.

To achieve the above object, an electric device which is of an approximately cylindrical structure, and which has on a circumferential surface thereof a terminal for connection to an external circuit, said electric device comprising: said third supporting means which is positioned approximately at a center of one end surface of said electric device; said plurality of third orientating means at least one of which is positioned asymmetric to any one of the other third orientating means about said center; and said plate according to claim 10 which has said fourth supporting means adapted to fit to said third supporting means, and which has said fourth orientating means adapted to fit to any one of said plurality of third orientating means.

In the electric device, a distance between any two of said plurality of third orientating means is smaller than 2× said determined dimension r.

In the electric device, said plurality of third orientating means is provided in an odd number.

In the electric device, coordinates (xi, yi) ($1 \leq i \leq 2m+1$) of said plurality of third orientating means is defined by equations (3) and (4) below when said center of said plate is assumed to be an origin, a line which passes through said origin and said terminal is assumed to be a Y axis, a line which passes through said origin and crosses said Y axis orthogonally is assumed to be an X axis, an outer diameter of said third supporting means is assumed to be r, and a number of said plurality of third orientating means is assumed to be (2m+1) (where m is a natural number), $$(x_i, y_i) = \left(r \cdot \cos\left(\frac{i \cdot \pi}{(m+1)}\right), r \cdot \left(\frac{i \cdot \pi}{(m+1)}\right)\right) (1 \leq i \leq m) \quad (3)$$

$$(x_i, y_i) = \left(r \cdot \cos\left(\frac{(2i+1) \cdot \pi}{2(m+1)}\right), r \cdot \left(\frac{(2i+1) \cdot \pi}{2(m+1)}\right)\right) (m+1 \leq i \leq 2m+1). \quad (4)$$

BRIEF DESCRIPTION OF THE DRAWINGS

These objects and other objects and advantages of the present invention will become more apparent upon reading of the following detailed description and the accompanying drawings in which:

FIG. 1A is an elevation of a motor according to a first embodiment of the present invention, and FIG. 1B is a side elevation of the motor;

FIG. 9A is an elevation of a motor according to a second embodiment of the present invention, and FIG. 9B is a side elevation of the motor.

FIG. 17A is an elevation of a conventional motor, and FIG. 17B is a side elevation of the motor;

DETAILED DESCRIPTION OF THE PREFERRED EMBODIMENTS

First Embodiment

Figure 2:
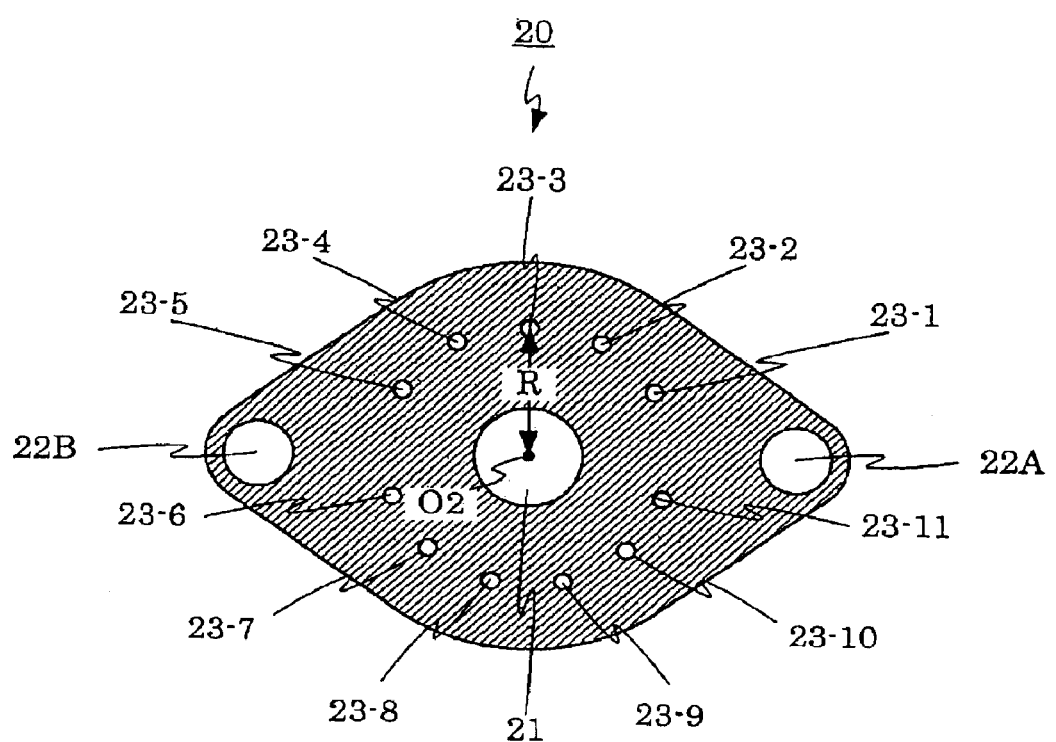
FIG. 2 is an elevation of a plate according to the first embodiment of the present invention.

A motor combined with a plate according to a first embodiment of the present invention will now be explained with reference to the drawings.

As shown in FIG. 1A, a motor 10 basically comprises a stator 11 having an approximately cylindrical structure. The stator 11 has an approximately circular embossed support member 12 on its front end surface, which has its center positioned so as to coincide with a center O1 of the front end surface, and has also a circular embossed orientating member 13 which is positioned so as to have its center positioned apart from the center O1 by a dimension R. The support member 12 is formed so as to rotatably fit into a support hole 21 formed in a plate 20 to be described later (refer to FIG. 2). The orientating member 13 is formed so as to fit into any one of orientating holes 23-1 to 23-11 (refer to FIG. 2) which are formed in the plate 20. A rotation shaft 14 penetrates through the motor 10 at the center of the front end surface of the stator 11 and is partially exposed. A terminal block 15 with terminal pins connected to an unillustrated external circuit (hereinafter, terminal block with terminal pins is referred to as "terminal") is provided at the circumferential surface of the stator 11, as shown in FIG. 1B.

The aforementioned plate 20 shown in FIG. 2 is formed of an approximately rhomboidal plate of stainless steel or the like, and defines a center O2. The plate 20 has a circular support hole 21 which has its center positioned so as to coincide with the center O2. The support hole 21 has a diameter substantially equal to the outer diameter of the support member 12, and rotatably fits into the support hole 21. The plate 20 has also two approximately circular screw holes 22A and 22B at its both ends, respectively. The screw holes 22A and 22B have a diameter substantially equal to the diameter of two screws 31A and 31B which are provided at a body 30 to be described later (refer to FIG. 5). The screw hole 22A has one of the two screws 31A and 31B going therethrough, and the screw hole 22B has the other of the two going therethrough. Further, the plate 20 has eleven circular orientating holes 23-1 to 23-11 which have their respective centers positioned equidistantly apart from the center O2 by the aforementioned dimension R, in other words, the orientating holes 23-1 to 23-11 are arranged along the circumference of a circle which defines the center O2 and a radius of the dimension R.

The diameter of the orientating holes 23-1 to 23-11 is substantially equal to the diameter of the orientating member 13, so that the orientating member 13 can fit into the orientating holes 23-1 to 23-11. The orientating holes 23-1 to 23-11 are asymmetrically positioned about the center O2.

Figure 3:
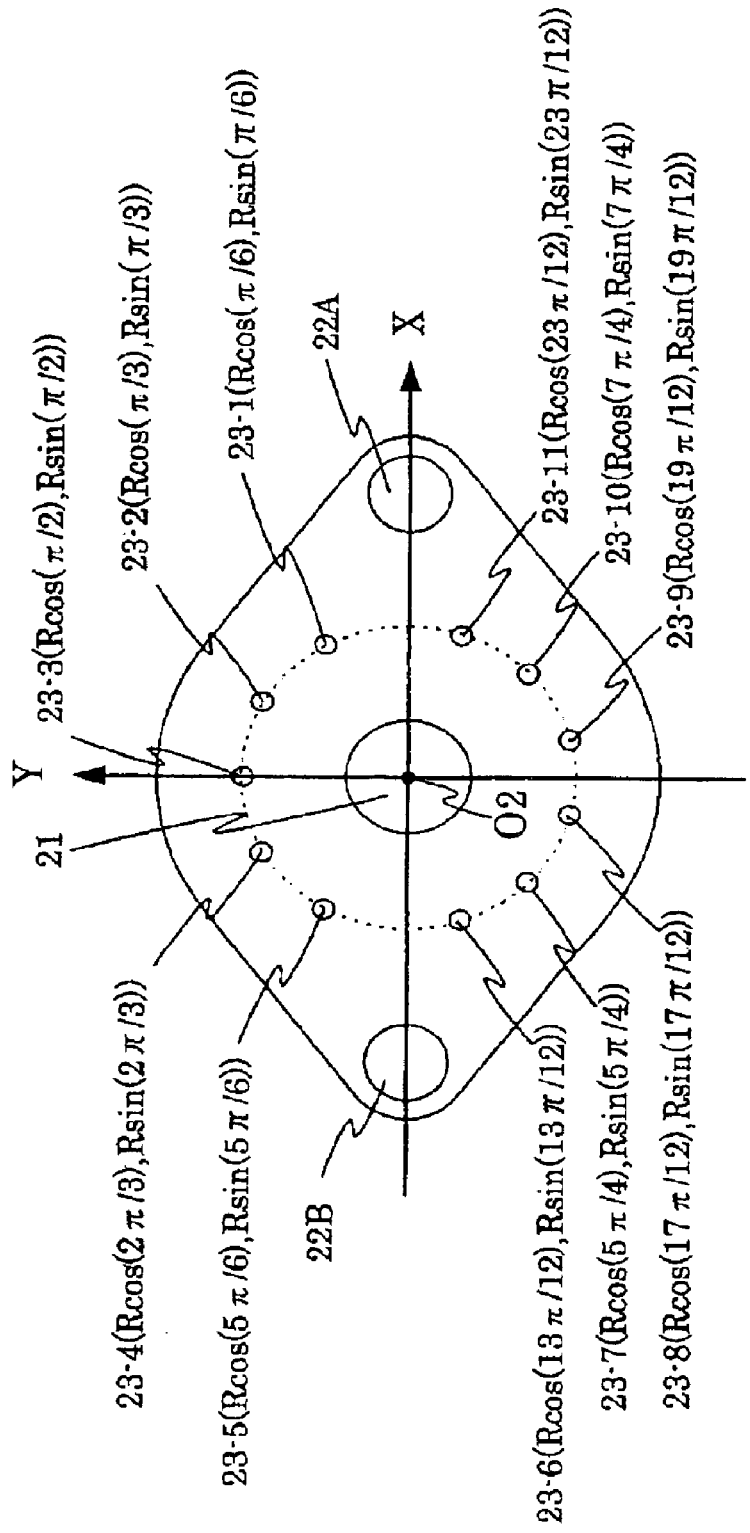
FIG. 3 is a diagram for explaining positions of orientating holes.

The positions of the orientating holes 23-1 to 23-11 will now be explained in more detail with reference to FIG. 3. In FIG. 3, the center O2 of the plate 20 is assumed to be an origin, a line that passes through the center O2, the center of the screw hole 22A, and the center of the screw hole 22B is assumed to be an X axis, and a line that passes through the center O2, and crosses the X axis orthogonally is assumed to be a Y axis.

As shown in FIG. 3, the orientating holes 23-1 to 23-5 are formed in the first and second quadrants, and the coordinates of the centers of the orientating holes 23-1 to 23-5 are represented by an equation (5) below.

$$(x_k, y_k) = \left(R \cdot \cos\left(\frac{k \cdot \pi}{6}\right), R \cdot \sin\left(\frac{k \cdot \pi}{6}\right)\right) \quad (1 \le k \le 5) \tag{5}$$

On the other hand, the orientating holes 23-6 to 23-11 are formed in the third and fourth quadrants, and the coordinates of the centers of the orientating holes 23-6 to 23-11 are represented by an equation (6) below.

$$(x_k, y_k) = \left(R \cdot \cos\left(\frac{(2k+1) \cdot \pi}{12}\right), R \cdot \sin\left(\frac{(2k+1) \cdot \pi}{12}\right)\right) \quad (6 \le k \le 11) \tag{6}$$

Next, a method of attaching the motor 10 onto the body 30 by using the plate 20, and a method of adjusting the orientation of the motor 10 relative to the body 30, that is, the orientation of the terminal 15 relative to the body 30 will be explained.

First, the plate 20 is set to the motor 10 such that the support hole 21 fits to the support member 12 and one of the orientating holes 23-1 to 23-11 fits to the orientating member 13. Then, the plate 20 which is set to motor 10 as described above is attached to the body 30 such that the screw hole 22A receives thereinto one of the two screws 31A and 31B provided at the body 30, and the screw hole 22B receives the other of the two thereinto. Thus, the motor 10 can be attached to the body 30 by way of the plate 20. And, the orientation of the motor 10 relative to the body 30, that is, the orientation of the terminal 15 relative to the body 30 can be adjusted minutely by selectively fitting the orientating member 13 into one of the orientating holes 23-1 to 23-11 that is different from the one mentioned above, and, if necessary, also by changing the mating combination of the screw holes 22A and 22B with the screws 31A and 31B.

The orientation of the terminal 15 relative to the body 30 will now be explained in more detail with reference to FIGS. 4A, 4B, 5, 6, 7 and 8. In FIGS. 5, 6, 7 and 8, the center O1 of the motor 10 is assumed to be an origin, a line that passes through the center O1, the center of the screw 31A, and the center of the screw 31A is assumed to be an X axis, and a line that passes through the center O1 and crosses the X axis orthogonally is assumed to be a Y axis. Further, an angle formed by the terminal 15 and the X axis is assumed to be θ.

Figure 4A:
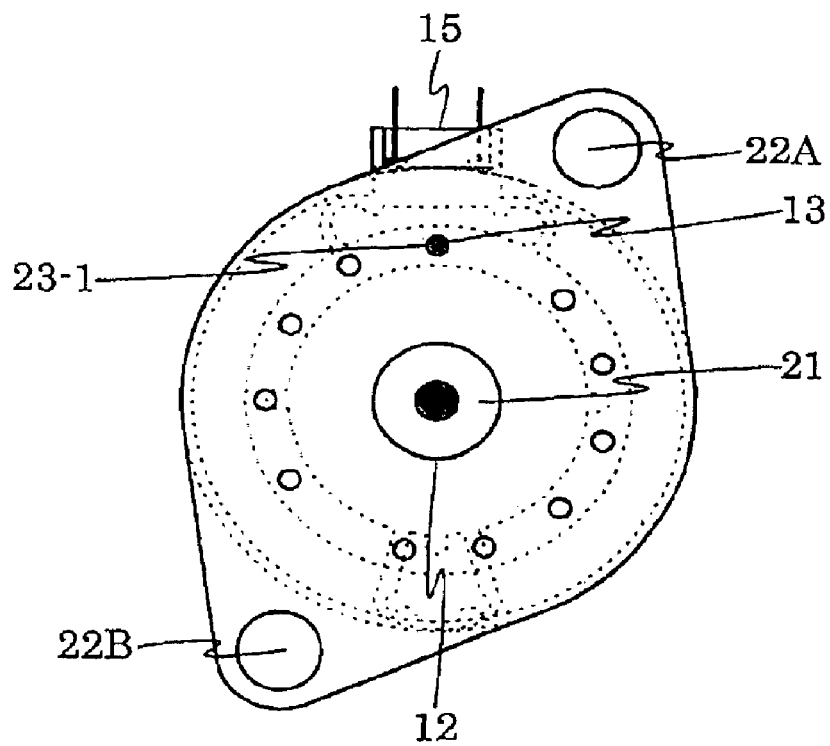
FIGS. 4A and 4B are diagrams showing a plate set to a motor.
Figure 5:
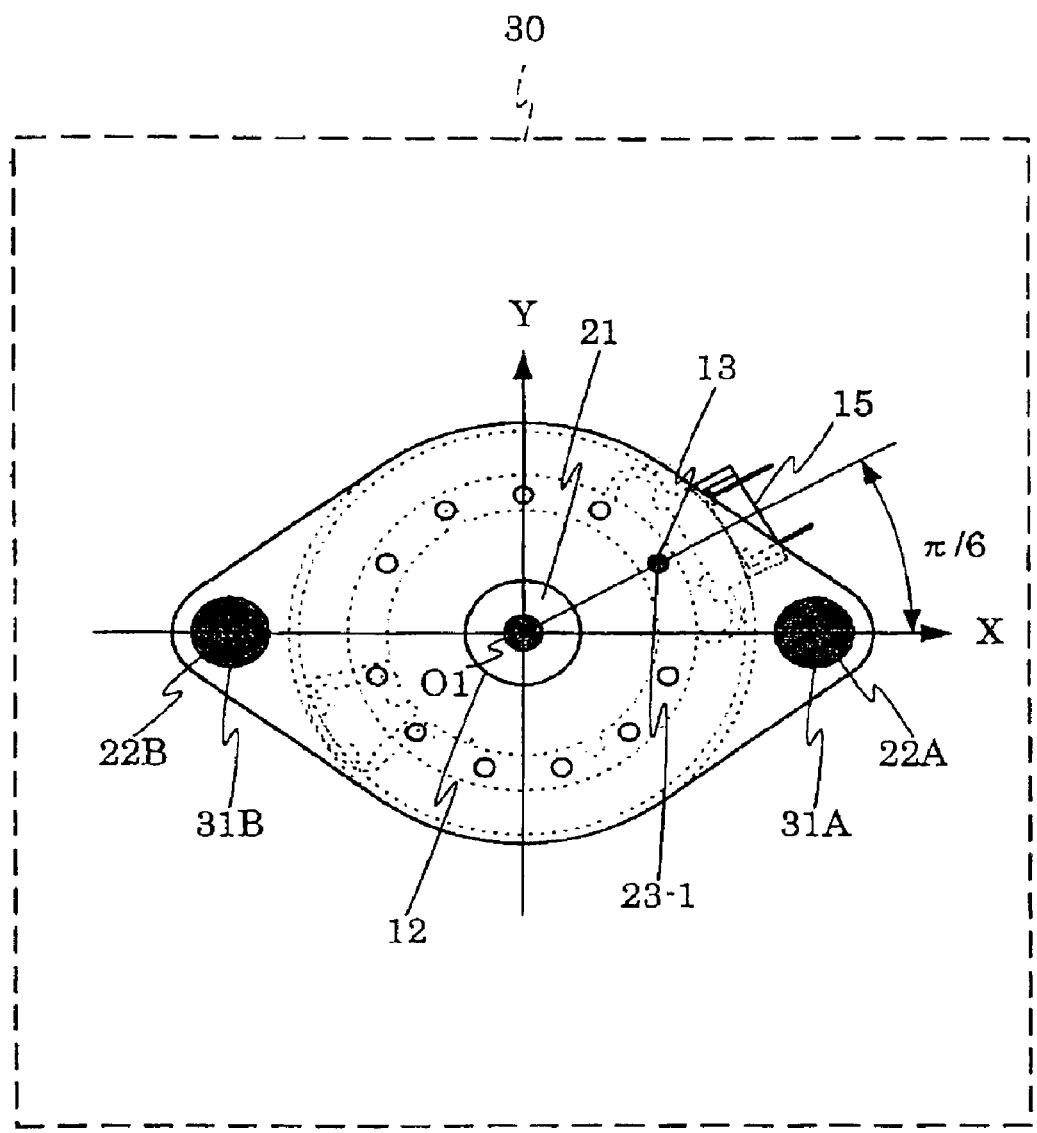
FIG. 5 is a diagram for explaining an orientation of a terminal relative to a body of an equipment.

In a case where the support hole 21 is set to the support member 12 such that the orientating member 13 fits into the orientating hole 23-1 as shown in FIG. 4A, and such that the screw hole 22A receives the screw 31A and the screw hole 22B receives the screw 31B as shown in FIG. 5, the angle θ is π/6 (=30°). Likewise, in a case where the support hole 21 is set to the support member 12 such that the orientating member 13 fits into the orientating hole 23-2 [23-3, 23-4, and 23-53], and such that the screw hole 22A receives the screw 31A a screw holes 22B receives the screw 31B, the angle θ is π/3 (=60°) [π/2 (=90°), 2π/3 (=120°), and 5π/6 (=150°), respectively].

Figure 4B:
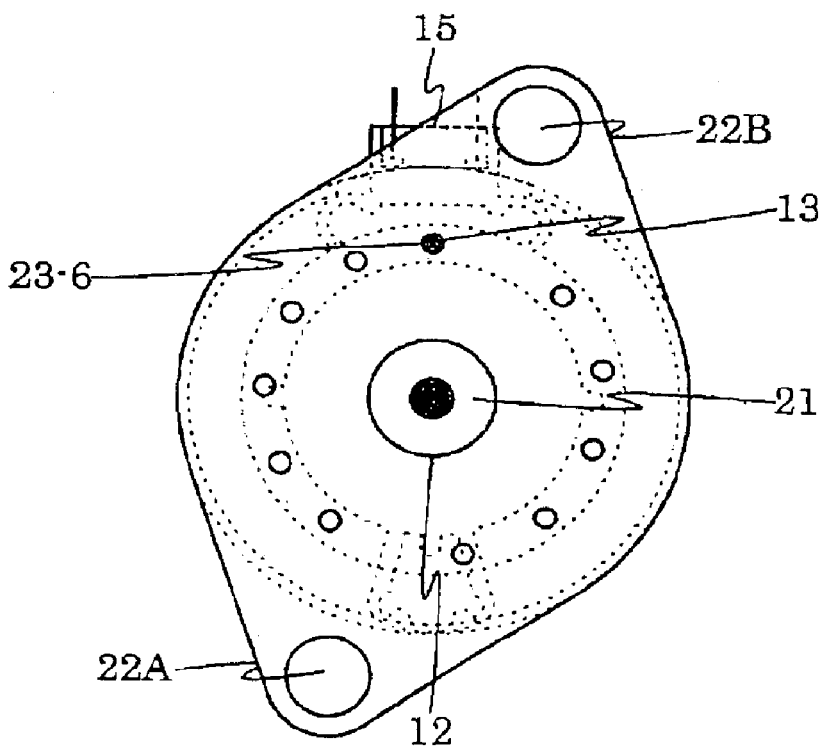
Figure 6:
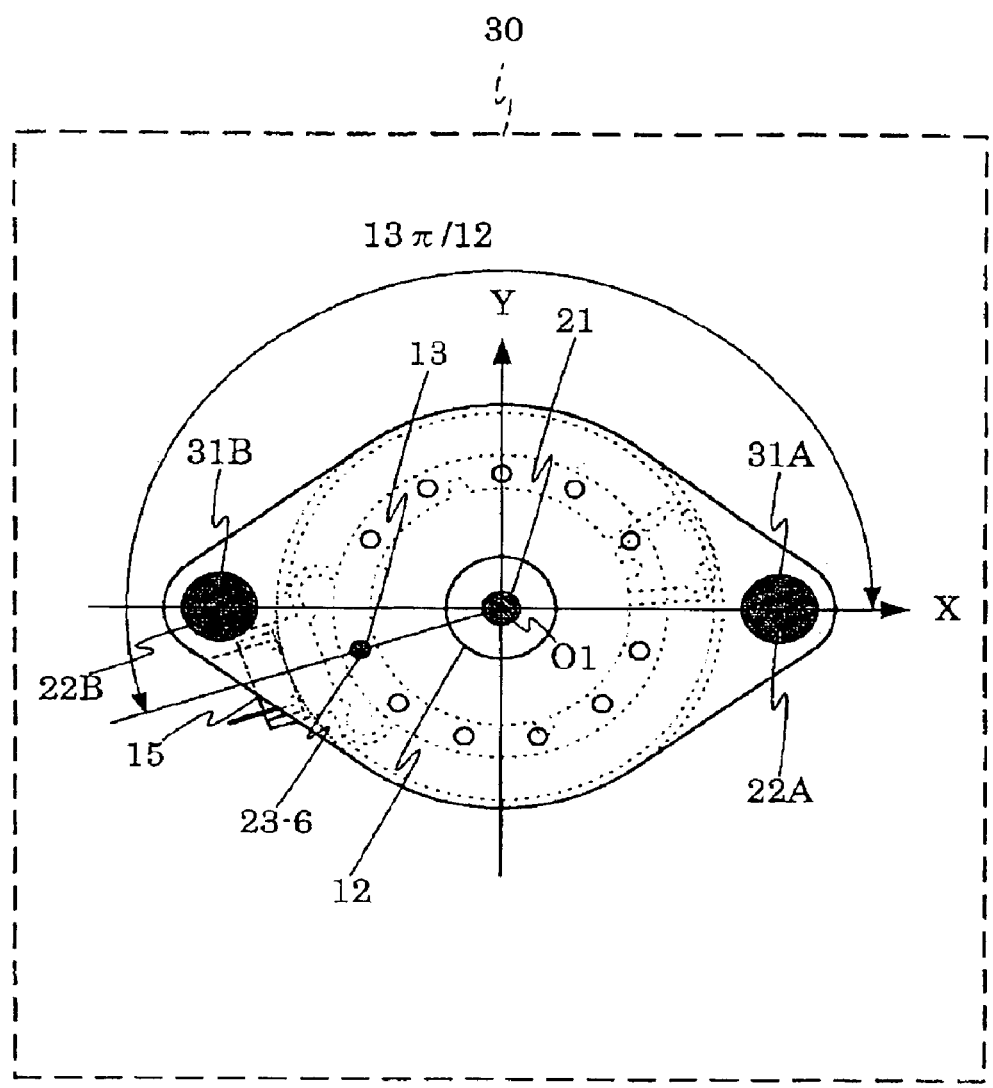
FIG. 6 is a diagram for explaining an orientation of a terminal relative to a body of an equipment.

In a case where the support hole 21 is set to the support member 12 such that the orientating member 13 fits into the orientating hole 23-6 as shown in FIG. 4B, and such that the screw hole 22A receives the screw 31A and the screw hole 22B receives the screw 31B as shown in FIG. 6, the angle θ is 13π/12 (=195°). Likewise, in a case where the support hole 21 is set to the support member 12 such that the orientating member 13 fits into the direction setting hole 23-7 [23-8, 23-9, 23-10, and 23-11], and such that the screw hole 22A receives the screw 31A and the screw hole 22B receives the screw 31B, the angle θ is 5π/4 (=225°) [17π/12 (=255°), 19π/12 (=285°), 7π/4 (=315°), and 23π/12 (=345°), respectively].

Figure 7:
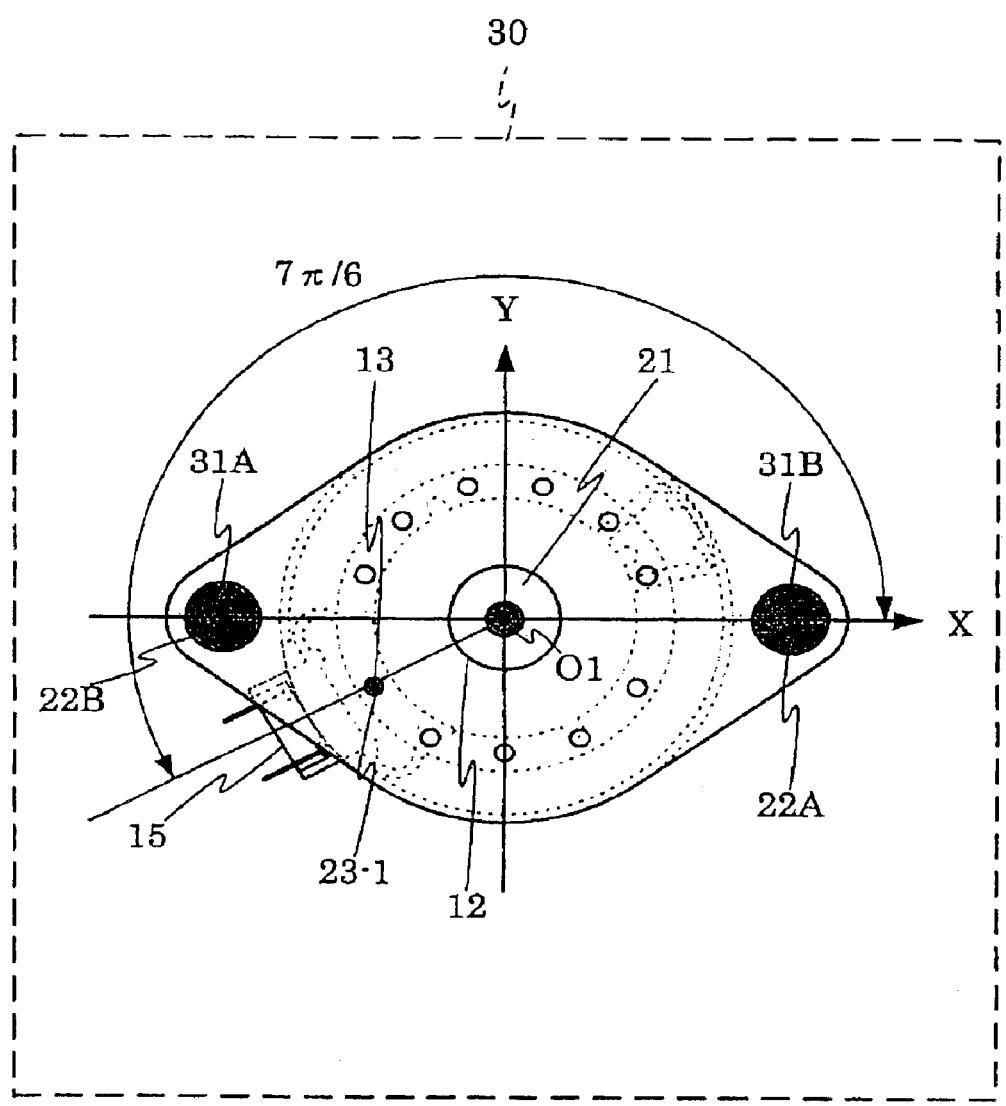
FIG. 7 is a diagram for explaining an orientation of a terminal relative to a body of an equipment.

In a case where the support hole 21 is set to the support member 12 such that the orientating member 13 fits into the orientating hole 23-1 as shown in FIG. 4A, and such that the screw hole 22A receives the screw 31B and the screw hole 22B receives the screw 31A as shown in FIG. 7, the angle θ is 7π/6 (=210°). Likewise, in a case where the support hole 21 is set to the support member 12 such that the orientating member 13 fits into the orientating hole 23-2 [23-3, 23-4, and 23-5], and such that the screw hole 22A receives the screw 31B and the screw hole 22B receives the screw 31A, the angle θ is 4π/3 (=240°) [3π/2 (=270°), 5π/3 (=300°), and 11π/6 (=330°), respectively].

Figure 8:
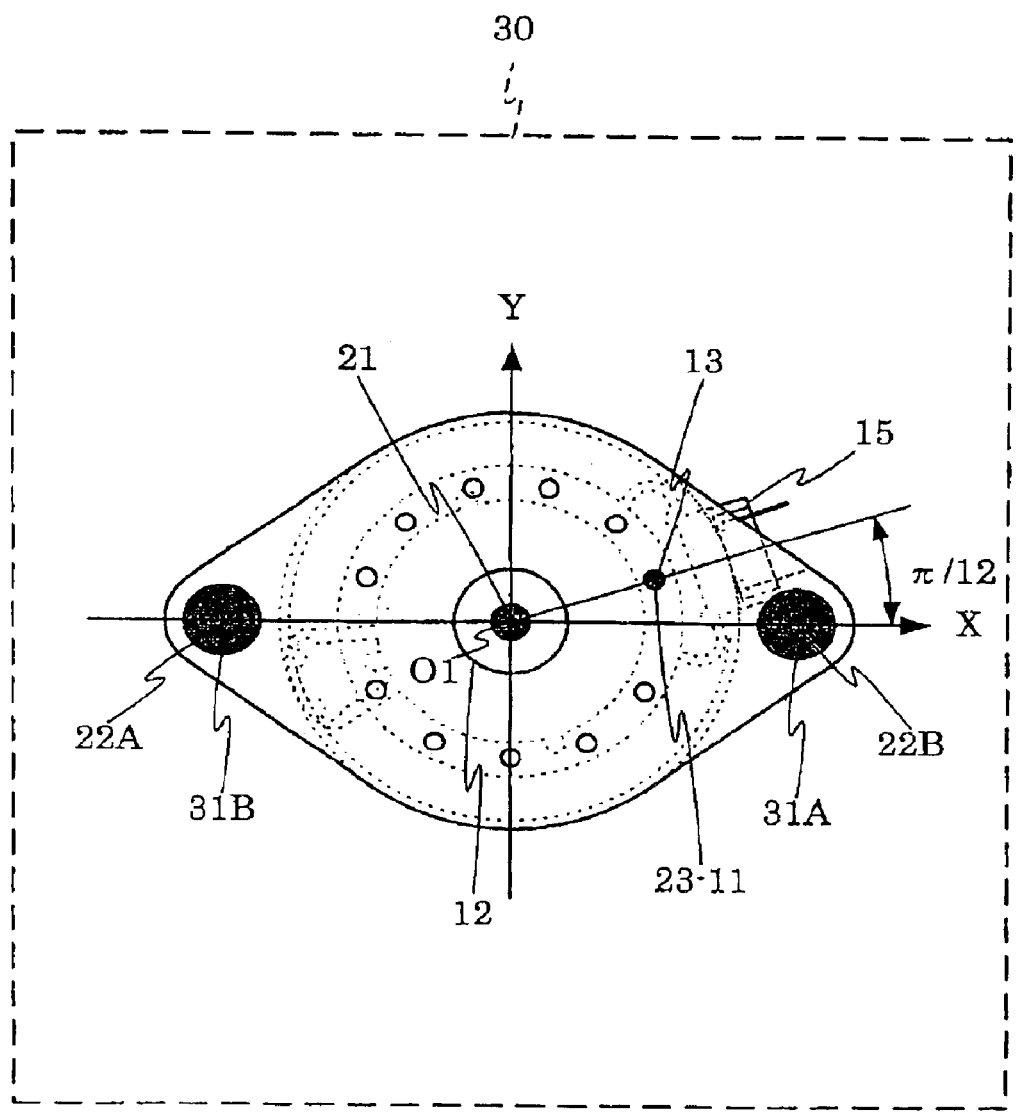
FIG. 8 is a diagram for explaining an orientation of a terminal relative to a body of an equipment.

Further, in a case where the support hole 21 is set to the support member 12 such that the orientating member 13 fits into the orientating hole 23-6 as shown in FIG. 4B, and such that the screw hole 22A receives the screw 31B and the screw hole 22B receives the screw 31A as shown in FIG. 8, the angle θ is 1π/12 (=15°). Likewise, in a case where the support hole 21 is set to the support member 12 such that the orientating member 13 fits into the orientating hole 23-7 [23-8, 23-9, 23-10, and 23-11], and such that the screw hole 22A receives the screw 31B and the screw hole 22B receives the screw 31A, the angle θ is π/4 (=45°) [5π/12 (=75°), 7π/12 (=105°), 3π/4 (=135°), and 11π/12 (=165°), respectively].

Thus, the orientation of the terminal 15 relative to the body 30 can be set minutely in increments of 15 degrees by means of only one plate 20, rendering a total of twenty two angle variations available. As a result, the number of plate variations required can be significantly reduced, whereby a higher efficiency can be achieved in the management of components and also motor assembly.

Second Embodiment

A motor combined with a plate according to a second embodiment of the present invention will now be explained with reference to the drawings.

As shown in FIG. 9A, a motor 40 basically comprise a stator 41 having an approximately cylindrical structure. The stator 41 has an approximately circular embossed support member 42 on its front end surface, which has its center positioned so as to coincide with a center O4 of the front end surface, and which has a radius r.

As shown in FIG. 9B, the stator 41 has, on its circumferential surface, a terminal block 45 with terminal pins connected to an unillustrated external circuit (hereinafter, terminal block with terminal pins is referred to as "terminal"). A rotation shaft 44 penetrates through the motor 40 at the center of the front end surface of the stator 41 and is partially exposed.

Figure 10:
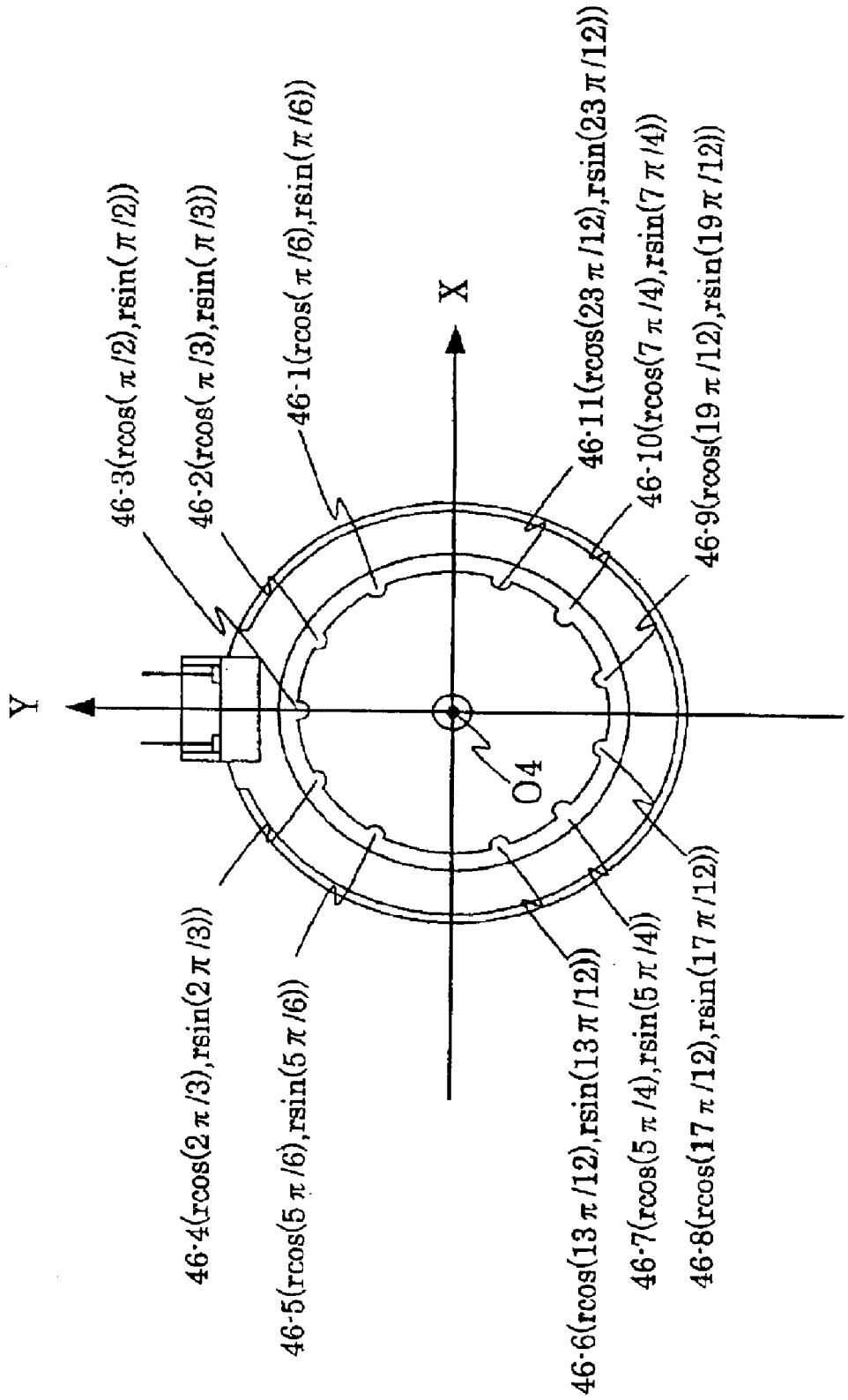
FIG. 10 is an elevation of a plate according to the second embodiment of the present invention.

As shown in FIG. 10, the support member 42 has eleven approximately semicircular orientating cuts 46-1 to 46-11 formed along the circumference thereof, i.e. the circumference of a circle which defines the center O4 and the radius r. The orientating cuts 46-1 to 46-11 are each formed so as to fit to an orientating boss 53 which is formed on a plate 50 to be described later (refer to FIG. 11). The orientating cuts 46-1 to 46-11 are asymmetrically positioned about the center O4.

The positions of the orientating cuts 46-1 to 46-11 will now be more specifically explained with reference to FIG. 10. In FIG. 10, the center O4 of the front end surface of the motor 40 is assumed to be an origin, a line that passes through the center O4 and the terminal 45 is assumed to be a Y axis, and a line that passes through the center O4 and crosses the Y axis orthogonally is assumed to be an X axis.

As shown in FIG. 10, the orientating cuts 46-1 to 46-5 are formed in the first and second quadrants, and the coordinates of the centers of the orientating cuts 461 to 46-11 are represented by an equation (7) below.

$$(x_i, y_i) = \left(r \cdot \cos\left(\frac{i \cdot \pi}{6}\right), r \cdot \sin\left(\frac{i \cdot \pi}{6}\right)\right) (1 \le i \le 5) \quad (7)$$

On the other hand, the orientating cuts 46-6 to 46-11 are formed in the third and fourth quadrants, and the coordinates of the centers of the orientating cuts 46-6 to 46-11 are represented by an equation (8) below.

$$(x_i, y_i) = \left(r \cdot \cos\left(\frac{(2i+1) \cdot \pi}{12}\right), r \cdot \sin\left(\frac{(2i+1) \cdot \pi}{12}\right)\right) (6 \le i \le 11) \quad (8)$$

Figure 11:
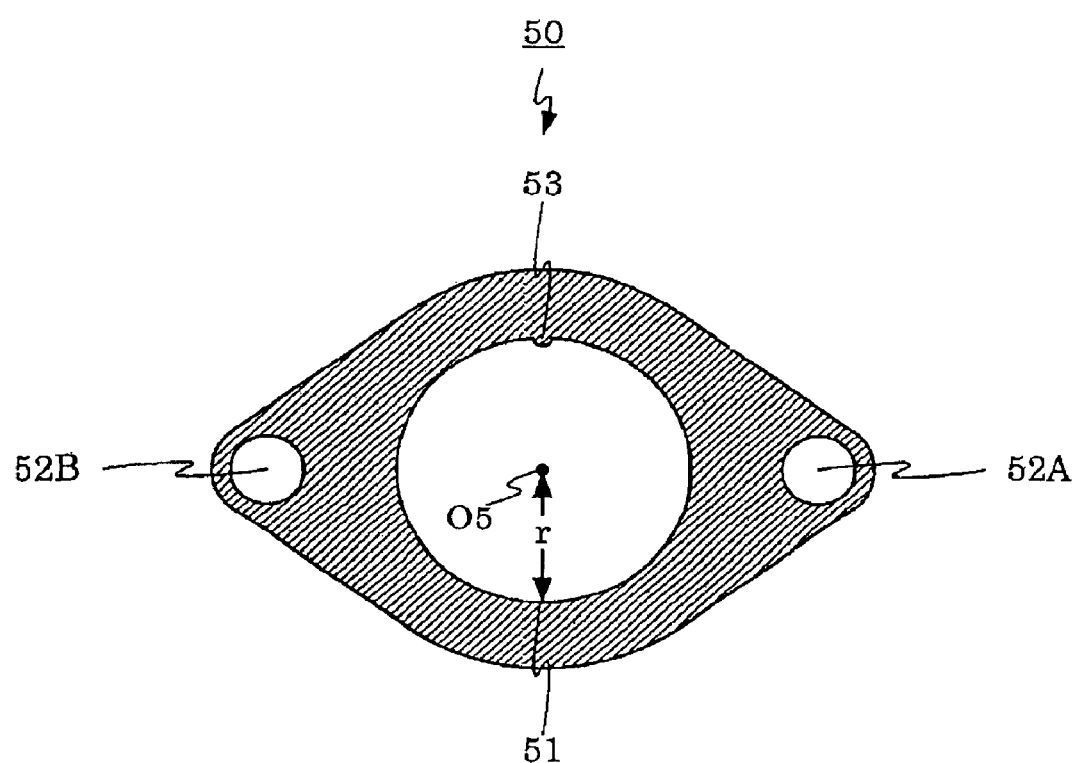
FIG. 11 is a diagram for explaining a position of an orientating embossed portion.

The aforementioned plate 50 shown in FIG. 11 is formed of an approximately rhomboidal plate of stainless steel or the like, and defines a center O5. The plate 50 has a circular support hole 51 which has its center positioned so as to coincide with the center O5. The diameter of the supporting hole 51 is substantially equal to the outer diameter r of the support member 42 so that the support member 42 can fit into the support hole 51. The support hole 51 has an orientating boss 53 on its circumference. The orientating boss 53 is formed so as to fit to any one of the orientating cuts 46-1 to 46-11 formed on the support member 42 provided at the motor 40.

Two screw holes 52A and 52B having an approximately circular shape, are formed respectively at both ends of the plate 50. The diameter of the screw holes 52A and 52B is substantially equal to the diameter of two screws 31A and 31B which are provided at a body 30. The screw hole 52A receives one of the two screws 31A and 31B tehreinto, and the screw hole 52B receives the other of the two thereinto.

Next, a method of attaching the motor 40 to the body 30 by using the plate 50, and also a method of adjusting the orientation of the motor 40 relative to the body 30, that is, the orientation of the terminal 45 relative to the body 30 will be explained.

First, the plate 50 is set to the motor 40 such that the supporting hole 51 fits to the supporting member 42 and the orientating boss 53 fits to one of the orientating cuts 46-1 to 46-11. Then, the plate 50 is attached to the body 30 such that the screw hole 52A receives one of the two screws 31A and 31B provided at the body 30, and the screw hole 52B receives the other of the two. Thus, the motor 40 can be attached to the body 30 by way of the plate 50. And, it is possible to adjust minutely the orientation of the motor 40 relative to the body 30, that is, the orientation of the terminal 45 relative to the body 30 by selectively fitting the orientating boss 53 to one of the orientating cuts 46-1 to 46-11 that is different from the one mentioned above, and, if necessary, also by changing the mating combination of the screws 31A and 31B with the screw holes 52A and 52B.

The orientation of the terminal 45 relative to the body 30 will now be more specifically explained with reference to FIGS. 13, 14, 15 and 16. In FIGS. 13, 14, 15 and 16, the center O4 of the motor 40 is assumed to be an origin, a line that passes through the center O4, the center of the screw 31A, and the center of the screw 31B is assumed to be an X axis, and a line that passes through the center O4 and crosses the X axis orthogonally is assumed to be a Y axis. An angle formed by the terminal 45 and the X axis is assumed to be θ.

Figure 12A:
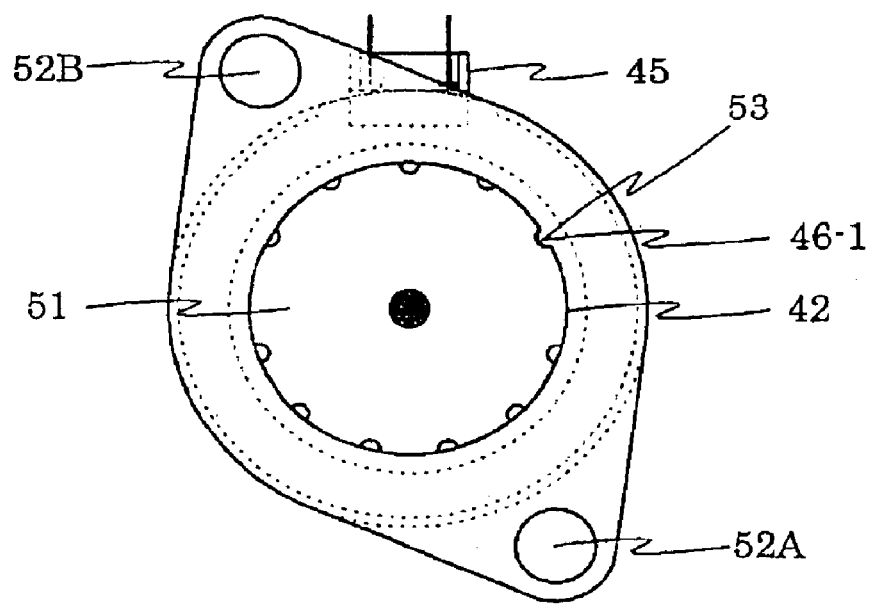
FIGS. 12A and 12B are diagrams showing a plate set to a motor.
Figure 13:
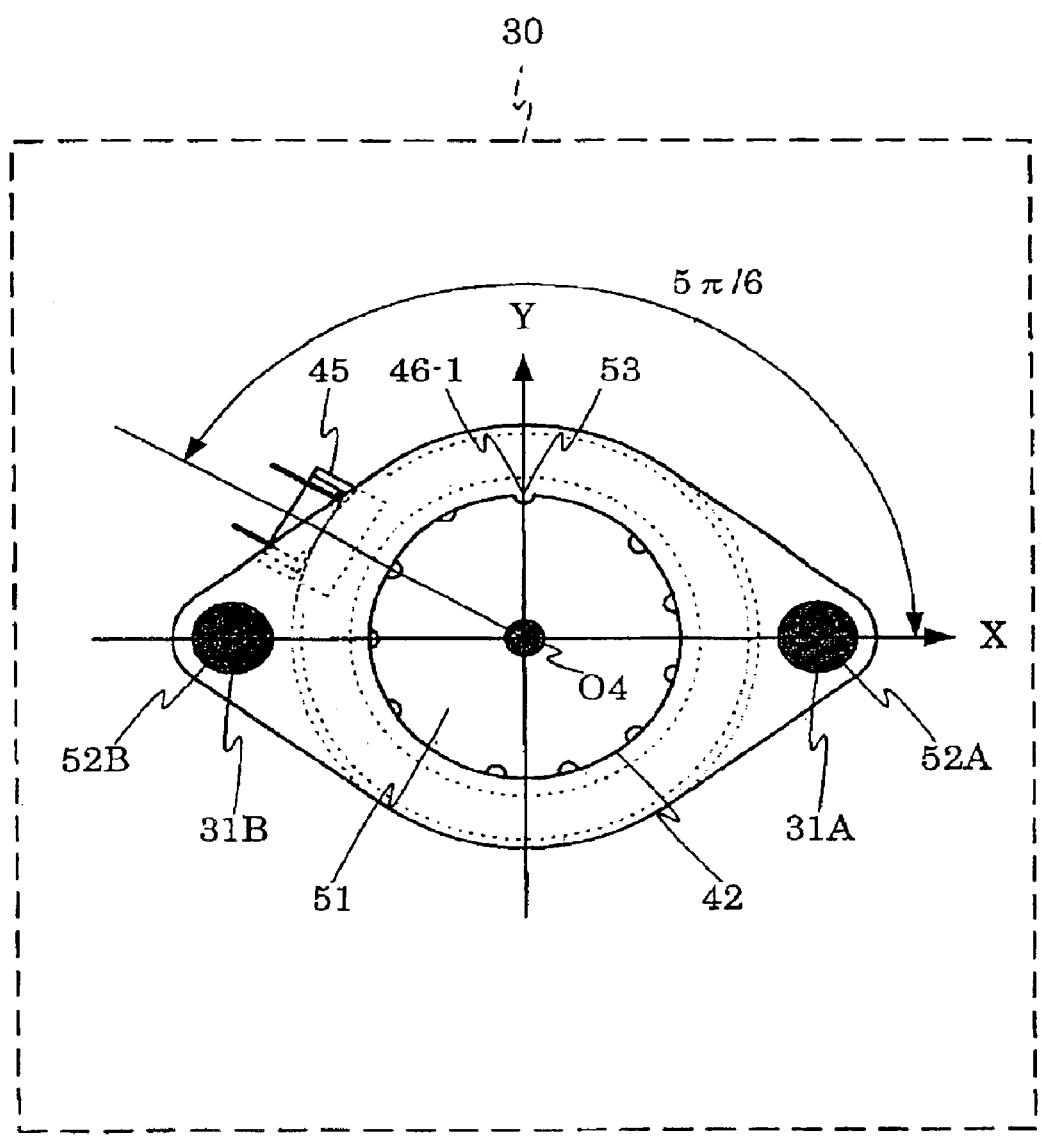
FIG. 13 is a diagram for explaining an orientation of a terminal relative to a body of an equipment.

In a case where the support hole 51 is set to the support member 42 such that the orientating boss 53 fits to the orientating cut 46-1 as shown in FIG. 12A, and such that the screw hole 52A receives the screw 31A and the screw hole 52B receives the screw 31B as shown in FIG. 13, the angle θ is 5π/6 (=150°). Likewise, in a case where the supporting hole 51 is set to the supporting member 42 such that the orientating boss 53 fits to the orientating cut 46-2 [46-3, 46-4, and 46-5], and such that the screw hole 52A receives the screw 31A and the screw hole 52B receives the screw 31B, the angle θ is 2π (=120°) [π/2 (=90°), π/3 (=60°), and π/6 (=30°), respectively].

Figure 12B:
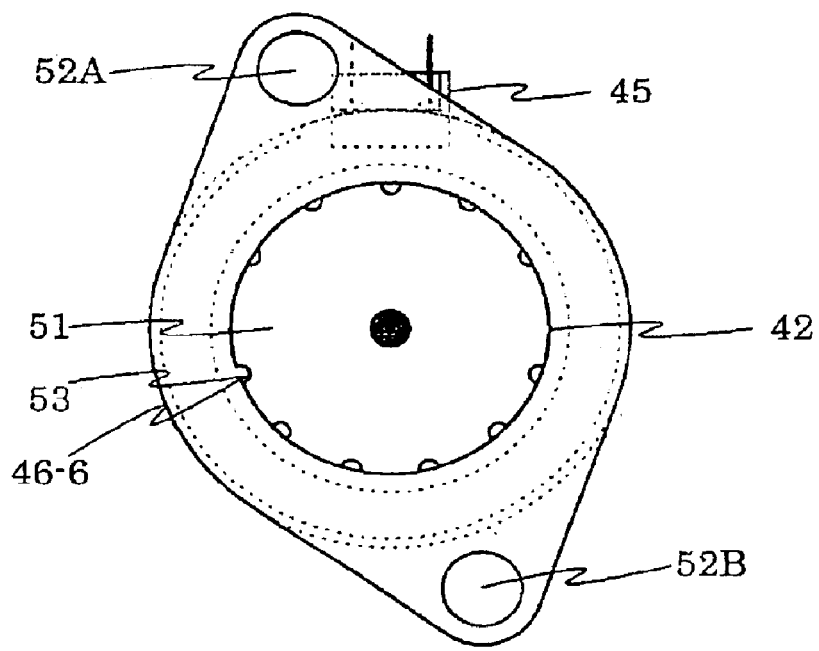
Figure 14:
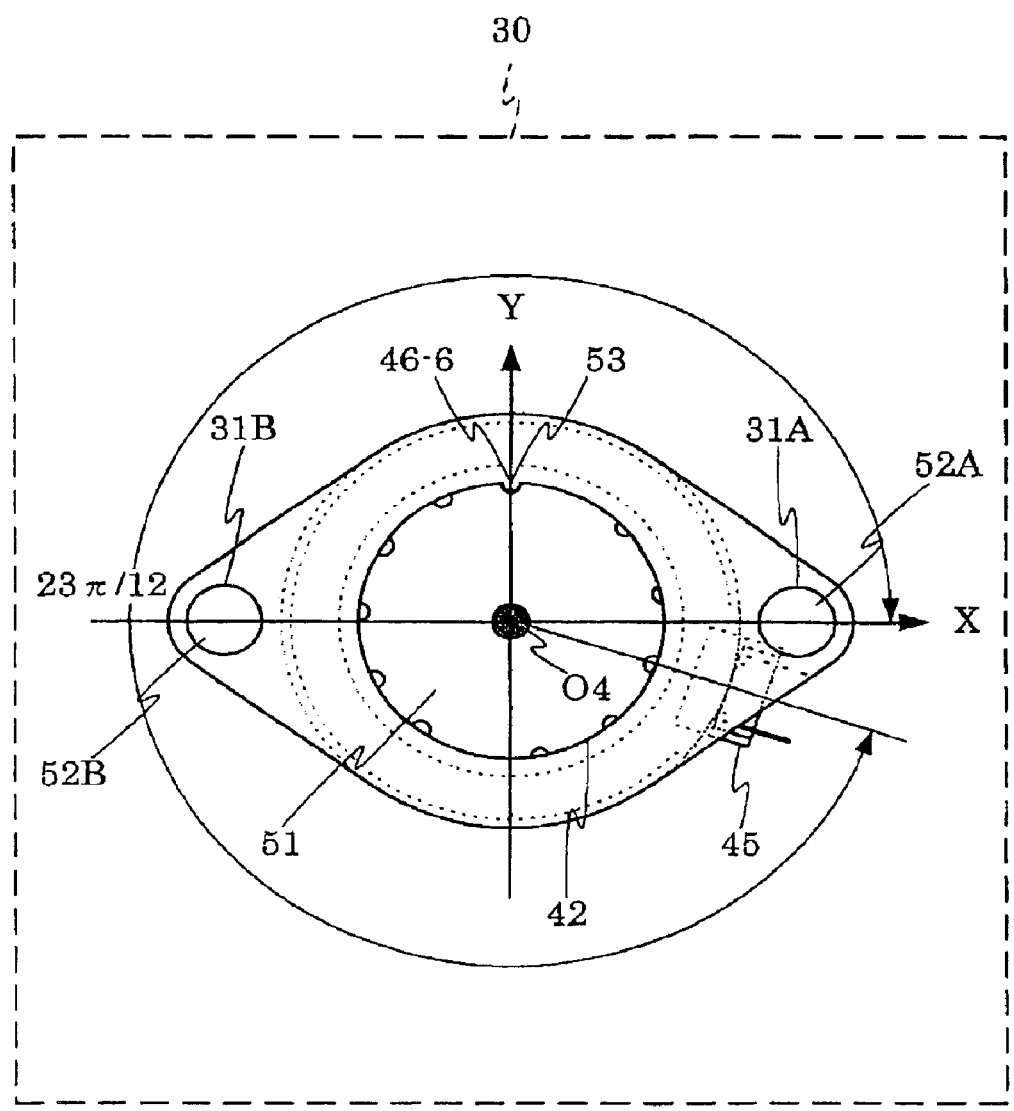
FIG. 14 is a diagram for explaining an orientation of a terminal relative to a body of an equipment.

In a case where the support hole 51 is set to the support member 42 such that the orientating boss 53 fits to the orientating cut 46-6 as shown in FIG. 12B, and such that the screw hole 52A receives the screw 31A and the screw hole 52B receives the screw 31B as shown in FIG. 14, the angle θ is 23π/12 (=345°). Likewise, in a case where the support hole 51 is set to the support member 42 such that the orientating boss 53 fits to the orientating cut 46-7 [46-8, 46-9, 46-10, and 46-11], and the screw hole 52A receives the screw 31A and the screw hole 52B receives the screw 31B, the angle θ is 7π/4 (=315°) [19π/12 (=285°), 17π/12 (=255°), 5π/4 (=225°), and 13π/12 (=195°), respectively].

Figure 15:
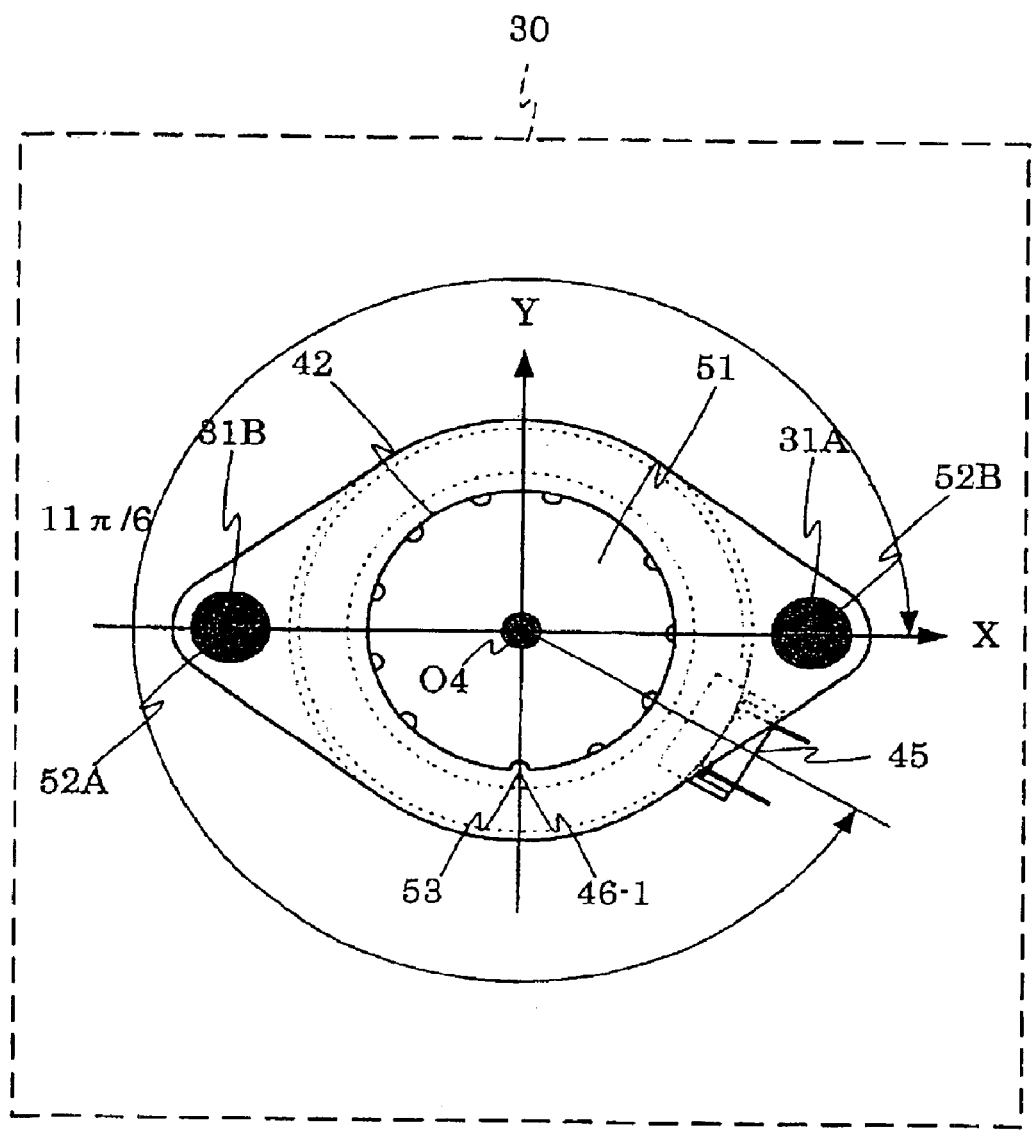
FIG. 15 is a diagram for explaining an orientation of a terminal relative to a body of an equipment.

In a case where the support hole 51 is fitted to the support member 42 such that the orientating boss 53 fits to the orientating cut 46-1 as shown in FIG. 12A, and such that the screw hole 52A receives the screw 31B and the screw hole 52B receives the screw 31A as shown in FIG. 15, the angle θ is 11π/6 (=330°). Likewise, in a case where the support hole 51 is set to the support member 42 such that the orientating boss 53 fits to the orientating cut 46-2 [46-3, 46-4, and 46-5], and such that the screw hole. 52A receive the screw 31B screw hole 52B receive the screw. 31A, the angle θ is 5π/3 (=300°) [3π/2 (=270°), 4π/3 (=240°), and 7π/6 (=210°), respectively].

Figure 16:
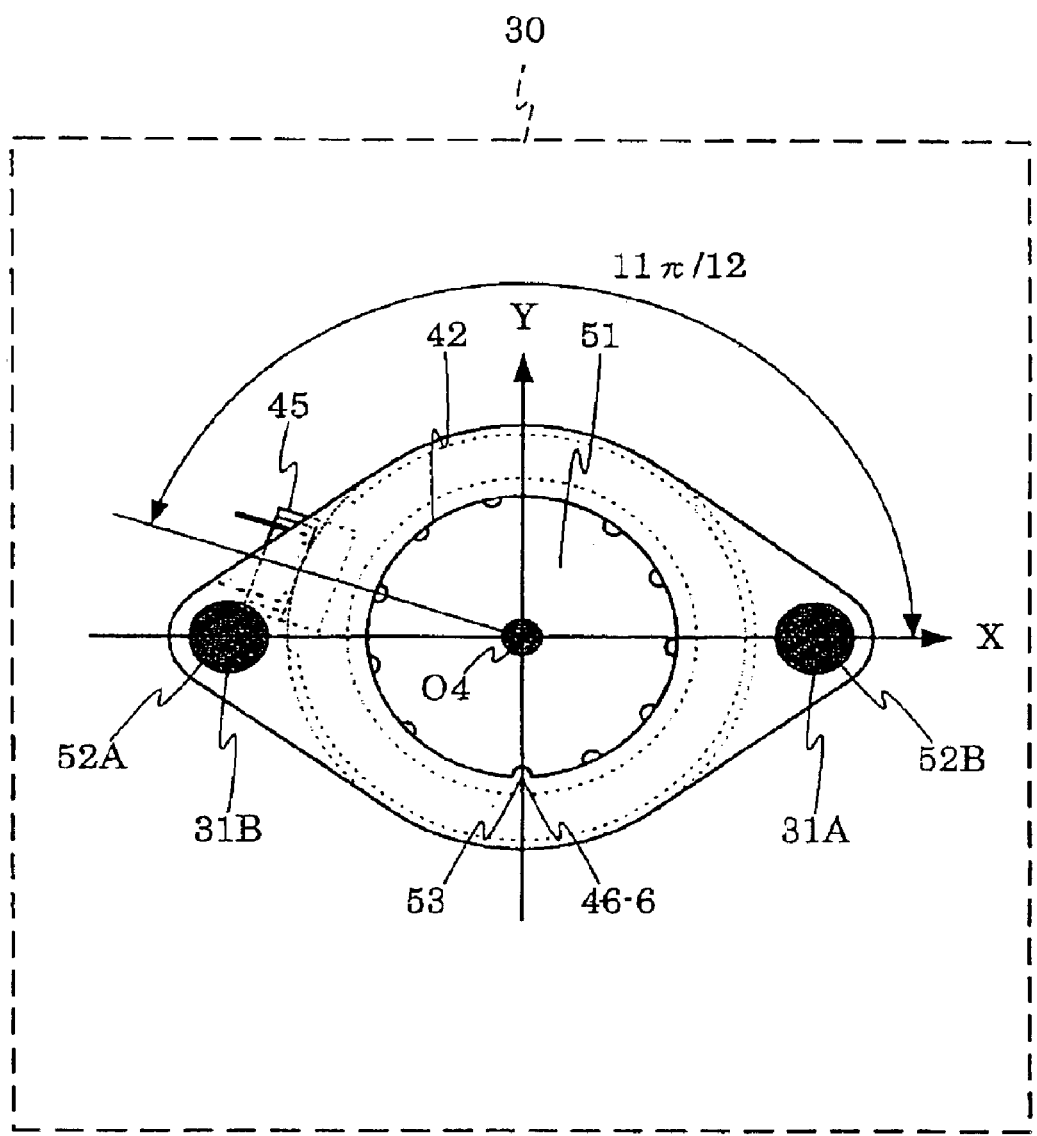
FIG. 16 is a diagram for explaining an orientation of a terminal relative to a body of an equipment.
Figure 18:
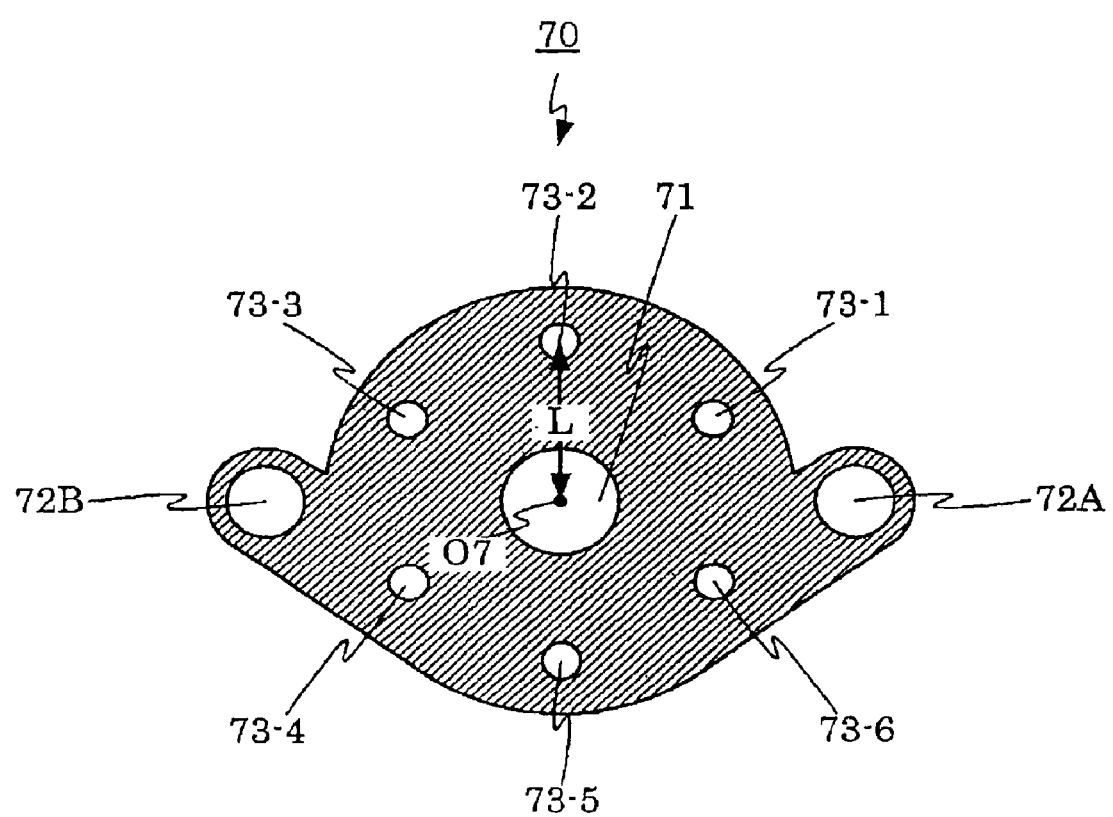
FIG. 18 is an elevation of a conventional plate.
Figure 19A:
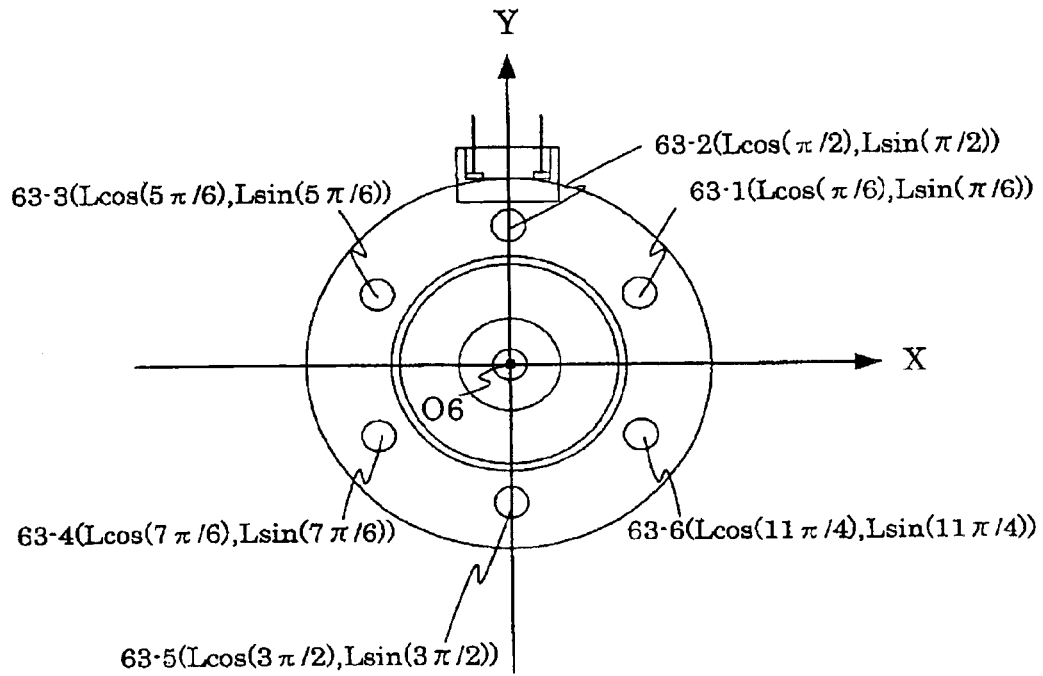
FIG. 19A is a diagram for explaining positions of orientating members.
Figure 19B:
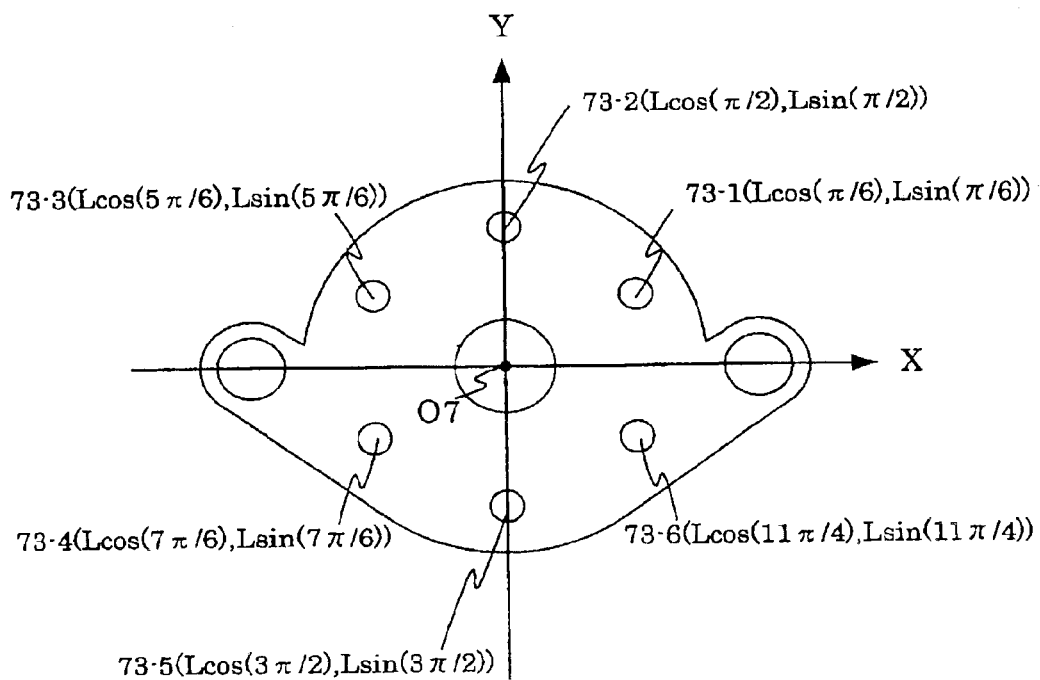
FIG. 19B is a diagram for explaining positions of orientating holes.
Figure 20:
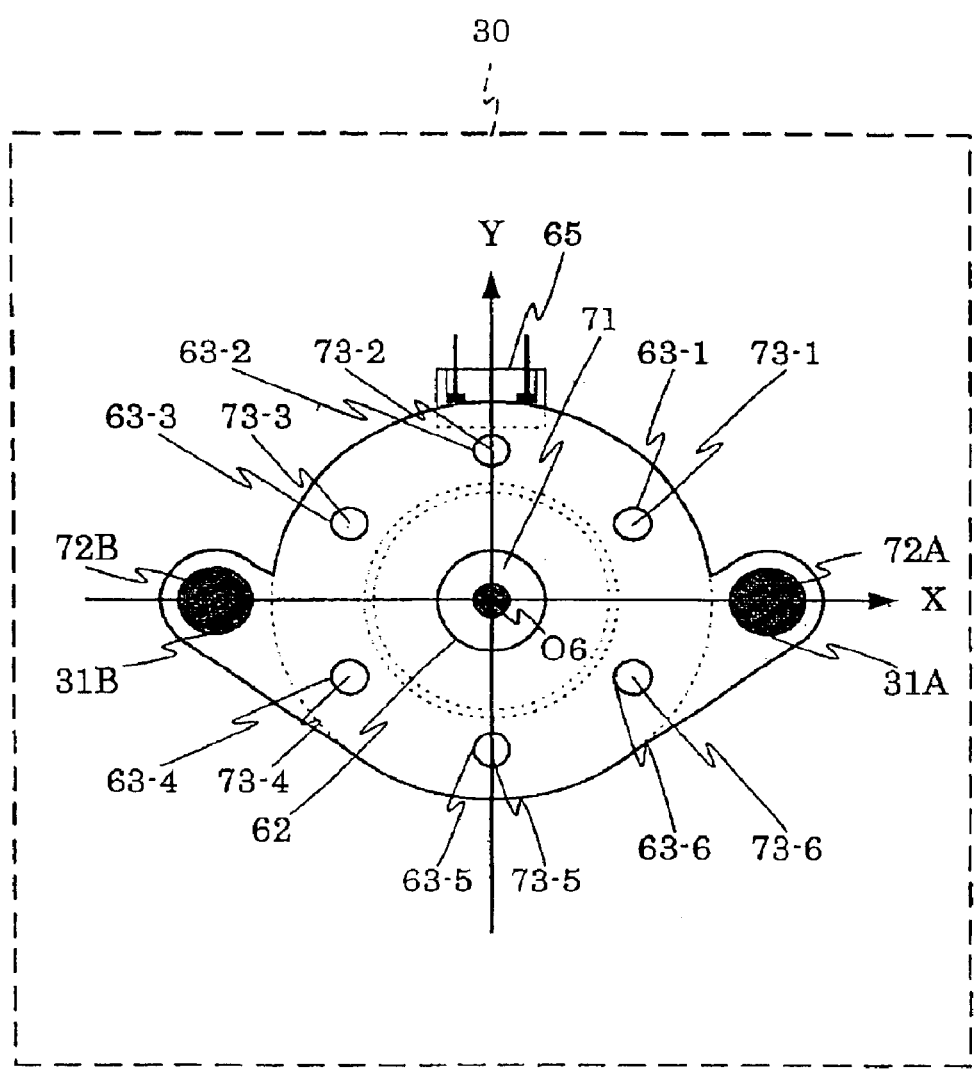
FIG. 20 is a diagram for explaining an orientation of a terminal relative to a body of an equipment.

Further, in a case where the support hole 51 is set to the support member 42 such that the orientating boss 53 fits to the orientating cut 46-6 as shown in FIG. 12B, and such that the screw hole 52A receives the screw 31B and the screw hole 52B receives the screw 31A as shown in FIG. 16, the angle θ is 11π/12 (=165°). Likewise, in a case where the support hole 51 is set to the support member 42 such that the orientating boss 53 fits to the orientating cut 46-7 [46-8, 46-9, 46-10, and 46-11], and such that the screw hole 52A receives the screw 31B and the screw hole 52B receives the screw 31A, the angle θ is 3π/4 (=135°) [7π/12 (=105°), 5π/12 (=75°), and π/4 (=45°), respectively].

Thus, the orientation of the terminal 45 relative to the body 30 can be set minutely in increments of 15 degrees by means of only one plate 50, rendering a total of twenty two angle variations available. As a result, the number of plate variations required can be significantly reduced whereby a higher efficiency can be achieved in the management of components and also motor assembly.

The present invention is not limited to the above-described embodiments, but can be modified and applied in various ways. A modification of the above-described embodiments which can be applied to the present invention will now be explained below.

In the above-described embodiments, a motor is employed as an example of an electric component. However, the present invention is not limited to a motor, but can be applied to any electric device that has a terminal on its circumferential surface.

Further, in the above-described embodiments, a motor and an equipment body have embossed or protruded structures such as screws, a support member, and an orientating member while a plate has holed structures such as screw holes, a support hole, and orientating holes. However, the present invention is not limited to this, but alternatively a motor and a device body may have holed, recessed, or caved structures while a plate may have embossed or protruded structures.

Further, in the second embodiment, a motor has orientating cuts while a plate has an orientating boss. However, the present invention is not limited to this, but alternatively a motor may have an orientating boss while a plate has orientating cuts.

Still further, in the above-described embodiments, the number of orientating holes or cuts is eleven. However, the present invention is not limited to this, but the number of the orientating holes or cuts may are appropriately determined.

And, in the above-described embodiments, a plate is first attached to a motor, and then attached to an equipment body. However, the present invention is not limited to this, but it may alternatively be such that a plate is first attached to an equipment body, then a motor is attached to the plate.

Various embodiments and changes may be made thereinto without departing from the broad spirit and scope of the invention The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-306257 filed on Oct. 21, 2002 and including specification, claims, drawings and summary. The disclosure of the above Japanese Patent Application is incorporated herein by reference in its entirety.

What is claimed is:

1. A plate for attaching a device having approximately circular first supporting means, and first orientating means positioned apart from a center of said first supporting means by a predetermined dimension, to an equipment body having a pair of first attaching means, said plate comprising:

second attaching means which is formed so as to fit to one of said pair of first attaching means of said equipment body;

third attaching means which is positioned symmetric to said second attaching means about a center of said plate so as to fit to the other of said pair of first attaching means;

second supporting means which has an approximately circular structure and which has its center coinciding with said center of said plate so as to fit to said first supporting means of said device; and plurality of second orientating means which are positioned on a circumference of a circle having its center coinciding with said center of said plate and having a radius of said predetermined dimension, and which are each formed so as to fit to said first orientating means of said device, at least one of said plurality of second orientating means being positioned asymmetric about said center of said plate to all other of said plurality of second orientating means.

2. The plate according to claim 1, adapted to attach said device, wherein said second and third attaching means, said second supporting means, and said plurality of second orientating means of said plate are of a holed structure so as to fit respectively to said first attaching means, said first supporting means, and said first orientating means of said device, which are of an embossed structure.

3. The plate according to claim 1, wherein a distance between all pairs of said plurality of second orientating means of said plate is smaller than 2× said predetermined dimension.

4. The plate according to claim 1, wherein said plurality of second orientating means is provided in an odd number.

5. The plate according to claim 1, wherein coordinates $(x_k, y_k)$ ($1 \leq k \; 2n \leq 1$) of said plurality of second orientating means is defined by equations (1) and (2) below when said center of said plate is assumed to be an origin, a line which passes through said origin and said second and third attaching means is assumed to be an X axis, a line which passes through said origin and crosses said X axis orthogonally is assumed to be a Y axis, said predetermined distance is assumed to be R, and a number of said plurality of second orientating means is assumed to be (2n+1) (where n is a natural number), $$(x_k, y_k) = \left(R \cdot \cos\left(\frac{k \cdot \pi}{(n+1)}\right), R \cdot \sin\left(\frac{k \cdot \pi}{(n+1)}\right)\right) (1 \leq k \leq n) \quad (1)$$

$$(x_k, y_k) = \left(R \cdot \cos\left(\frac{(2k+1) \cdot \pi}{2(n+1)}\right), R \cdot \sin\left(\frac{(2k+1) \cdot \pi}{2(n+1)}\right)\right) (n+1 \leq k \leq 2n+1). \quad (2)$$

6. The plate according to claim 1, wherein said device is of an approximately cylindrical structure, has said first supporting means formed approximately at a center of one end surface thereof, has said first orientating means formed on said one end surface and positioned apart from said center by said predetermined dimension, and has a protruding portion provided at a predetermined position on a circumferential surface thereof.

7. The plate according to claim 6, wherein said device is an electric device, and said protruding portion is a terminal for connection to an external circuit.

8. An electric device which is of an approximately cylindrical structure, and which has on a circumferential surface thereof a terminal for connection to an external circuit, said electric device comprising:

said first supporting means which is positioned approximately at a center of one end surface of said electric device;

said first orientating means which is positioned apart from said center by a predetermined dimension; and said plate according to claim 1, which has said second supporting means adapted to fit to said first supporting means, and which has said plurality of second orientating means each adapted to fit to said first orientating means.

9. A plate for attaching a device having approximately circular first supporting means, and having also a plurality of a first orientating means formed on a circumference of said first supporting means, to an equipment body having a pair of first attaching means, said plate comprising:

second attaching means which is formed so as to fit to one of said pair of first attaching means of said equipment body;

third attaching means which is positioned symmetric to said second attaching means about a center of said plate so as to fit to the other of said pair of first attaching means;

second supporting means which has an approximately circular structure and which has its center coinciding with said center of said plate so as to fit to said first supporting means of said device; and second orientating means which is adapted to fit to any one of said plurality of first orientating means of said device.

10. The plate according to claim 9, adapted to attach said device, wherein said first supporting means of said device is of an embossed structure, and said second supporting means of said plate is of a holed structure.

11. The plate according to claim 9, wherein said second orientating means of said plate is one of an embossed structure and a caved structure, and said plurality of orientating means of said device are contrarily one of a caved structure and an embossed structure to thereby fit to second orientating means.

12. The plate according to claim 9, wherein said device is of an approximately cylindrical structure, has said first supporting means formed approximately at a center of one end surface thereof, and has a protruding portion provided at a predetermined position on a circumferential surface thereof.

13. The plate according to claim 12, wherein said device is an electric device, and said protruding portion is a terminal for connection to an external circuit.

14. An electric device which is of an approximately cylindrical structure, and which has on a circumferential surface thereof a terminal for connection to an external circuit, said electric device comprising:

said first supporting means which is positioned approximately at a center of one end surface of said electric device;

said plurality of first orientating means at least one of which is positioned asymmetric to any one of the other first orientating means about said center; and said plate according to claim 9 which has said second supporting means adapted to fit to said first supporting means, and which has said second orientating means adapted to fit to any one of said plurality of first orientating means.

15. The electric device according to claim 14, wherein a distance between any two of said plurality of first orientating means is smaller than 2× said determined dimension.

16. The electric device according to claim 14, wherein said plurality of first orientating means is provided in an odd number.

17. The electric device according to claim 14, wherein coordinates ($1 \leq i \leq 2m+1$) of said plurality of first orientating means is defined by equations (3) and (4) below when said center of said plate is assumed to be an origin, a line which passes through said origin and said terminal is assumed to be a Y axis, a line which passes through said origin and crosses said Y axis orthogonally is assumed to be an X axis, an outer diameter of said first supporting means is assumed to be r, and a number of said plurality of first orientating means is assumed to be (2m+1) (where m is a natural number), $$(x_i, y_i) = \left( r \cdot \cos\left(\frac{i \cdot \pi}{(m+1)}\right), r \cdot \left(\frac{i \cdot \pi}{(m+1)}\right) \right) \quad (1 \leq i \leq m) \tag{3}$$

$$(x_i, y_i) = \left( r \cdot \cos\left(\frac{(2i+1) \cdot \pi}{2(m+1)}\right), r \cdot \left(\frac{(2i+1) \cdot \pi}{2(m+1)}\right) \right) \quad (m+1 \leq i \leq 2m+1). \tag{4}$$

18. A plate for attaching a device, said device having a plurality of first orientating members positioned apart at a predetermined dimension from a center of an approximately circular first supporting member of said device, to an equipment body having a first screw and a second screw, said plate having portions defining:

a first screw hole formed to fit to said first screw;

a second screw hole symmetrically positioned to said first screw hole about a center of said plate, said second screw hole formed to fit to said second screw;

a support hole configured to fit to said first supporting member of said device; and a plurality of orientating holes positioned to fit to said plurality of first orientating members of said device, and at least one of said plurality of orientating holes being asymmetrically positioned about said center of said plate to all other of said plurality of orientating holes.

* * * * *